Patented Jan. 20, 1942

2,270,689

UNITED STATES PATENT OFFICE 2,270,689

STABLE PHARMACEUTICAL PREPARATION

Ludwig Schütz, Wuppertal-Elberfeld, Germany, assignor to Winthrop Chemical Company, Inc., New York, N. Y., a corporation of New York No Drawing. Application March 8, 1939, Serial No. 260,505. In Germany March 11, 1938

1 Claim. (Cl. 167—67)

This invention relates to preparations of acyl salicylic acids containing alkaloids.

Preparations containing acyl salicylic acids and alkaloids, for instance quinine, or neutral salts of the alkaloids, have considerable therapeutic interest. The mixtures of the said preparations, however, are not stable; they decompose after a short time, for instance with splitting off of organic acid. Quinine may be transformed into quinotoxine. The decomposition may be observed externally by sticking together of the powder mixture or by having a smell of organic acid, for instance acetic acid or by decoloration of the mixture, particularly in pressed form, for instance in tablets.

In accordance with the present invention preparations of ortho-acyloxy-benzene carboxylic acids and alkaloid salts which comply with the practical requirements as to their stability are obtainable by manufacturing the said preparations of ortho-acyloxy-benzene carboxylic acids and alkaloids while using instead of the alkaloid or its neutral salt an acid salt thereof the acidity of which corresponds to a hydrogen ion concentration (pH) of less than about 4.5. A preparation containing acetyl salicylic acid and quinine dihydrochloride (pH 3.2) in even distribution remains externally unchanged after prolonged storage even at a temperature of 37° C. and no free acid can be observed, whereas a mixture of quinine or of its neutral salts with acetyl salicylic acid has when stored under the same conditions after a short time a strong smell of acetic acid and sticks together to a solid mass.

The acyl derivatives of salicylic acid, for instance acetyl salicylic acid are the preferred ortho-acyloxy-benzene carboxylic acid compounds. Other suitable ortho-acyloxy-benzene carboxylic acids are, for instance, acyl salicylic acids which are alkylated in the benzene ring, for instance by the methyl group, but also compounds containing higher alkyl radicals, for instance isooctyl-acetyl-salicylic acid, furthermore alkoxylated compounds such as methoxy-acetyl-salicylic acid and such acyloxy-benzene carboxylic acids as contain the grouping of the ortho-acyloxy-benzene carboxylic acids several times. The acetyl radical is the preferred acyl radical, but also other acyl radicals, such as the propionyl, methoxyacetyl and furfuroyl radicals have proved as being suitable. The new preparations are manufactured for instance by intimately grinding the components with one another or by mixing them in an indifferent solvent and subsequently removing the solvent. The acyl salicylic acid advantageously is used in excess. The surprizing stability of the products thus obtainable may be explained by a chemical action of the components upon one another, the formation of molecule compounds being probable.

The invention is illustrated by the following examples without being restricted thereto:

Example 1

10 parts of acetyl salicylic acid and one part of quinine dihydrochloride are intimately ground to obtain an even distribution of the components. The mixture as well as the tablets, manufactured therefrom in the manner known per se while adding starch, have proved as being stable.

Example 2

1 part of quinine dihydrochloride is finely distributed in 5 parts of benzene and a solution of 5 parts of isooctyl-acetyl-salicylic acid in 20 parts of benzene is added to this mixture. Thereupon the benzene is removed at a low temperature, preferably under reduced pressure. The residue is a colorless stable powder.

Example 3

10 parts of acetyl salicylic acid and 2 parts of papaverin hydrochloride (pH 4.1) are intimately ground. In contradistinction to a mixture of acetyl salicylic acid and papaverin which already after a short time shows a content of free salicylic acid owing to the formation of acetic acid the above described preparation remains unchanged even after a long storage in the incubator. Preparations manufactured in the same way while using acetyl-meta-cresotinic acid or isooctyl-furfuroyl-salicylic acid or 4.4'-diacetoxy- diphenyl-dimethylmethane-dicarboxylic acid-3.3' or furfuroyl-salicylic acid show an equally good stability. The said acids also give a stable preparation when evenly distributed with quinine dihydrochloride.

I claim:

Composition of matter comprising acetyl salicylic acid in even distribution with quinine dihydrochloride which composition contains its components in a practically stable form.

LUDWIG SCHÜTZ.